United States Patent
Xu et al.

(10) Patent No.: US 6,942,783 B2
(45) Date of Patent: Sep. 13, 2005

(54) ENHANCED FCC CATALYSTS FOR GAS OIL AND RESID APPLICATIONS

(75) Inventors: Mingting Xu, Edison, NJ (US); David Matheson Stockwell, Westfield, NJ (US)

(73) Assignee: Engelhard Corporation, Iselin, NJ (US)

( * ) Notice: Subject to any disclaimer, the term of this patent is extended or adjusted under 35 U.S.C. 154(b) by 65 days.

(21) Appl. No.: 10/440,608

(22) Filed: May 19, 2003

(65) Prior Publication Data

US 2004/0235642 A1 Nov. 25, 2004

(51) Int. Cl.[7] .................................................. B01J 29/08
(52) U.S. Cl. .................... 208/120.01; 208/118; 502/64; 502/65; 502/68; 502/73; 502/79
(58) Field of Search ............................. 502/64, 65, 68, 502/73, 79; 208/118, 120.01

(56) References Cited

U.S. PATENT DOCUMENTS

| | | | |
|---|---|---|---|
| 3,458,454 A | 7/1969 | Lapides et al. | |
| 3,503,900 A | 3/1970 | Haden et al. | |
| 3,506,594 A | 4/1970 | Dzierzanowski et al. | |
| 3,533,962 A | 10/1970 | Cosgrove | |
| 3,944,482 A | 3/1976 | Mitchell et al. | |
| 4,493,902 A | 1/1985 | Brown et al. | |
| 4,581,340 A | 4/1986 | Himpsl et al. | |
| 4,606,813 A | 8/1986 | Byrne et al. | |
| 4,628,042 A | 12/1986 | Speronello | |
| 4,631,262 A | 12/1986 | Altomare | |
| 4,965,233 A | 10/1990 | Speronello | |
| 5,023,220 A | 6/1991 | Dight et al. | |
| 5,071,539 A | 12/1991 | Hayward et al. | |
| 5,234,578 A | 8/1993 | Stine et al. | |
| 5,243,121 A | 9/1993 | Madon et al. | |
| 5,300,469 A | 4/1994 | Deeba et al. | |
| 5,316,656 A | 5/1994 | Pellet et al. | |
| 5,358,632 A | 10/1994 | Hendrick | |
| 5,384,041 A | 1/1995 | Deeba et al. | |
| 5,395,809 A | 3/1995 | Madon et al. | |
| 5,413,978 A | 5/1995 | Kramer | |
| 5,462,652 A | 10/1995 | Wegerer | |
| 5,521,133 A | 5/1996 | Koermer et al. | |
| 5,559,067 A | 9/1996 | Lerner et al. | |
| 5,662,868 A | 9/1997 | Letzsch et al. | |
| 5,766,558 A | 6/1998 | Letzsch et al. | |
| 5,976,355 A | 11/1999 | Johnson et al. | |
| 5,993,645 A | 11/1999 | Madon et al. | |
| 6,004,527 A | 12/1999 | Murrell et al. | |
| 6,010,618 A | 1/2000 | Lomas | |
| 6,045,688 A | 4/2000 | Ruottu et al. | |
| 6,063,263 A | 5/2000 | Palmas | |
| 6,656,347 B2 * | 12/2003 | Stockwell et al. | 208/120.01 |
| 6,673,235 B2 * | 1/2004 | Harris et al. | 208/120.01 |
| 6,696,378 B2 * | 2/2004 | Gibson et al. | 502/79 |
| 6,716,338 B2 * | 4/2004 | Madon et al. | 208/120.01 |
| 2002/0115556 A1 | 8/2002 | Stockwell et al. | |
| 2003/0089640 A1 * | 5/2003 | Madon et al. | 208/122 |

FOREIGN PATENT DOCUMENTS

| | | | |
|---|---|---|---|
| GB | 1342977 | | 1/1974 |
| WO | WO 02/24329 | * | 3/2004 |

OTHER PUBLICATIONS

D. M. Stockwell, "The Role of Porosity in the Cracking Selectivity of FCC Catalysts." Prepared for presentation at the 3rd International Conference on Refinery Processing, Mar. 2000 AIChE Meeting, Copyright 1999, Engelhard Corporation, Unpublished.jo.

Copy of patent list from International Search Report, no date available.

* cited by examiner

*Primary Examiner*—Christina Johnson
(74) *Attorney, Agent, or Firm*—Raymond F. Keller

(57) ABSTRACT

A fluid catalytic cracking catalyst is provided with a high porosity by in-situ crystallizing an aluminosilicate zeolite from a reactive microsphere comprising metakaolin and hydrous kaolin. Any calcination of the reactive microsphere before reaction with a zeolite-forming solution is done at low temperatures so as to ensure the hydrous kaolin is not converted to metakaolin.

64 Claims, No Drawings

ENHANCED FCC CATALYSTS FOR GAS OIL AND RESID APPLICATIONS

BACKGROUND OF THE INVENTION

The present invention relates to novel fluid catalytic cracking catalysts comprising microspheres containing Y-faujasite zeolite and having exceptionally high activity and other desirable characteristics, methods for making such catalysts and the use of such catalysts for cracking petroleum feedstocks, particularly under short residence time processes.

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows:

"The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Two products that are particularly undesirable in commercial catalytic cracking processes are coke and hydrogen. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50–70% by weight Y faujasite and methods for making such catalysts by crystallizing more than about 40% sodium Y zeolite in porous microspheres composed of a mixture of two different forms of chemically reactive calcined kaolin, namely, metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin. In a preferred embodiment, the microspheres containing the two forms of calcined kaolin are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin ($Al_2O_3$: $2SiO_2$: $2H_2O$) and powdered calcined kaolin that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin and kaolin calcined to undergo the exotherm are then calcined under controlled conditions, less severe than those required to cause kaolin to undergo the exotherm, in order to dehydrate the hydrated kaolin portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated kaolin and spinel are present in the spray dryer feed and the resulting calcined microspheres contain somewhat more kaolin that has undergone the exotherm than metakaolin. The '902 patent teaches that the calcined microspheres comprise about 30–60% by weight metakaolin and about 40–70% by weight kaolin characterized through its characteristic exotherm. A less preferred method described in the patent, involves spray drying a slurry containing a mixture of kaolin previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking. Thus, increases in the zeolite content of the high zeolite content microspheres have been reported to be highly desirable.

The activity and selectivity characteristics of the catalysts formed by the process of the '902 patent are achieved even though, in general, the catalysts have relatively low total porosity as compared to fluid catalytic cracking catalysts prepared by incorporating the zeolite content into a separate matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35–20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely effect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized that, under the short contact time processing of hydrocarbons, further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

While the present assignee has produced zeolite microspheres with increased zeolite content and increased activity by increasing the macroporosity of the spray dried microsphere zeolite precursors, the porosity of the formed zeolite microsphere catalysts has not before been considered a problem since there has been found no diffusion limitation under the previous FCC processing techniques. For example, commonly assigned, U.S. Pat. No. 4,965,233, to Speronello discloses increasing the zeolite content of an in-situ catalyst by forming highly porous precursor microspheres, which allow increased amounts of zeolite to grow within the porous matrix. The highly porous precursor microspheres are formed by spray drying a slurry of hydrous kaolin, which is characterized by the presence of a major amount of large (greater than 2 microns) kaolin stacks along with spinel calcined kaolin. When spray dried, the coarse hydrous kaolin results in microspheres having a desired high content of macropores in which the zeolite Y can grow. Likewise, commonly assigned, U.S. Pat. No. 5,023,220, to Dight, et. al. also increases the macroporosity of the precursor microspheres by spray drying a mixture of hydrous kaolin, metakaolin and spinel. These catalyst microspheres have a substantial level of zeolite and are very active and selective. Further, the high alumina, silica-alumina matrix portion of the catalysts is often totally surrounded by the zeolite formed in-situ such that the matrix is only now understood to provide a reduced level of bottoms cracking under the short contact time FCC conditions.

In commonly assigned, copending application U.S. Ser. No. 09/956,250, filed Sep. 20, 2001, novel zeolite microspheres are disclosed. These zeolite microspheres are macroporous, have sufficient levels of zeolite to be very active and are of a unique morphology to achieve effective conversion of hydrocarbons to cracked gasoline products with improved bottoms cracking under SCT FCC processing. The novel zeolite microspheres are produced by novel processing, which is a modification of technology described in U.S. Pat. No. 4,493,902. It has been found that if the non-zeolite, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced. More generally, the FCC catalyst matrix useful to achieve FCC catalyst macroporosity is derived from alumina sources, such as kaolin calcined through the exotherm, that have a specified water pore volume, which distinguishes over prior art calcined kaolin used to form the catalyst matrix. The water pore volume is derived from an Incipient Slurry Point (ISP) test, which is described in the application.

The morphology of the microsphere catalysts which are formed is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined herein means the catalyst has a macropore volume in the pore range of 600–20,000 Å of at least 0.07 cc/gm mercury intrusion. The novel catalyst is optimal for FCC processing, including the short contact time processing in which the hydrocarbon feed is contacted with a catalyst for times of about 3 seconds or less.

In the broadest sense, the invention as disclosed in U.S. Ser. No. 09/956,250 is not restricted to macroporous catalysts having a non-zeolite matrix derived solely from kaolin. Thus, any alumina source which has the proper combinations of porosity and reactivity during zeolite synthesis and can generate the desired catalyst macroporosity and morphology can be used. The desired morphology comprises a matrix which is well dispersed throughout the catalyst, and the macropore walls of matrix are lined with zeolite and are substantially free of binder coatings. Accordingly, not only is the large pore surface area of the catalyst vastly improved over previous catalysts, and the active matrix dispersed throughout the microsphere, the zeolite crystals are readily accessible to the hydrocarbon feed. While not wishing to be bound by any theory of operation, it appears that previous catalysts in which the zeolite is incorporated into a matrix by physical mixing and glued with binder have sufficient macroporosity, however the binder coats the active zeolite catalyst thereby blocking accessibility thereto. The novel microsphere catalysts have a morphology which allows fast diffusion into the catalyst due to the macroporosity and enhanced dispersion of the matrix, and further provides the highest accessibility to the zeolite inasmuch as the zeolite is freely coated onto the walls of the pores. The term "freely" means that the zeolite phase is present on the surface of the matrix and is unobstructed by any binder phases. Merely having macroporosity does not provide the results that have been obtained, since conventional incorporated catalysts have similar macroporosity. It is therefore the combination of porosity and zeolite-coated macropore walls that give the surprising selectivity results.

One would not have anticipated that contacting a heavy hydrocarbon feed, whose molecules are frequently if not generally too large to enter zeolite pores, with zeolite prior to feed contact with the matrix would be optimal, as has been found. Indeed, the prevailing "staged cracking" theory suggests the opposite, that the larger hydrocarbon molecules are first cracked on the active matrix and the formed smaller molecules subsequently cracked within the zeolite. Much research and promotional activity has been done in pursuit or support of this perceived ideal.

In view of the success of the macroporous in-situ-formed zeolite microsphere as disclosed above, there is a continuing need to find novel macroporous zeolite catalysts in which the matrix is dispersed throughout the catalyst and the zeolite crystals are free of binder coatings and readily accessible to the hydrocarbon feed. There is a need as well to find other methods of forming such catalysts. Therefore, it is an object of the invention to provide a novel method for reproducibly preparing a catalyst that is an attrition resistant, highly porous catalyst with a zeolite-coated matrix morphology and provide novel catalysts having such properties.

SUMMARY OF THE INVENTION

In accordance with the present invention, a novel macroporous in-situ-formed zeolite catalyst is provided by forming a precursor reactive microsphere which contains reactive metakaolin and inert hydrous kaolin. The microsphere is reacted with an alkaline silicate solution to form the zeolite crystals. The presence of the hydrous kaolin as a matrix precursor has been found to yield a macroporous structure on the order of that disclosed in the aforementioned copending application, U.S. Ser. No. 09/956,250. In the copending application the macroporous structure is achieved using a calcined, ultra-fine hydrous kaolin as the matrix precursor. The catalyst of this invention can also include a matrix derived in part from kaolin calcined through the characteristic exotherm, as well as a calcined boehmite alumina which has been found useful for metal passivation.

In the process of forming the novel catalyst of the present invention, metakaolin, hydrous kaolin, and a silicate binder are spray dried to form a precursor reactive microsphere. The hydrous kaolin is maintained as an inert component even if the as-spray dried microsphere is calcined by calcining at a lower temperature and avoiding the endothermic transformation of hydrous kaolin to metakaolin. The inert hydrous kaolin is not consumed under the caustic crystallization conditions. The metakaolin provides the reactive silica and alumina for crystallization and also enables the presence of high pore volume in the spray dried microsphere. The amount of metakaolin, or more generally, the amount of soluble alumina available to crystallize zeolite, is limited so that yield of zeolite is limited during the crystallization resulting in a sufficient macroporosity.

DETAILED DESCRIPTION OF THE INVENTION

Catalysts of the invention are made by spray drying a feed mixture of hydrated kaolin, metakaolin, and a binder such as silica sol or sodium silicate. The spray dried microspheres are optionally acid-neutralized and washed to reduce sodium content. The spray dried microsphere are preferably subsequently calcined to form precursor porous microspheres. Importantly in this invention, the hydrous kaolin is maintained as an inert component by calcining at lower temperatures so as to avoid the endothermic transformation of the hydrous kaolin component to metakaolin. Calcination temperatures of less than 1000° F., preferably less than 800° F., can be used to calcine the spray dried microspheres.

The amount of metakaolin in the spray dried and optionally calcined microspheres provides the soluble alumina available to grow zeolite. The amount of metakaolin present in the spray dried microspheres is limited with respect to the inerts such as hydrous kaolin so that the yield of zeolite is limited during crystallization. An excessive level of metakaolin in the reactive microsphere would yield a high level of zeolite that would reduce the porosity of the microsphere to an undesired low level. Accordingly, the spray dried microspheres after optional calcination will contain a metakaolin content of up to 50 wt. %, preferably up to 45 wt %, and more preferably will be present in amounts of 30–40 wt %.

Any binder used should contain only sodium, expressed as $Na_2O$, which is easily removed. Although the silica or silicate binders traditionally used do bring these nutrients into the zeolite crystallization process, their main purpose is to provide mechanical strength to the green microspheres sufficient to withstand processing up until crystallization. Therefore, any binder capable of fulfilling this role while not interfering with the other constraints laid out herein would be adequate. Aluminum chlorohydrol for example might be useful.

The precursor microspheres are reacted with zeolite seeds and an alkaline sodium silicate solution, substantially as described in U.S. Pat. No. 5,395,809, the teachings of which are incorporated herein by cross-reference. The microspheres are crystallized to a desired zeolite content (typically ca. 40–75%), filtered, washed, ammonium exchanged, exchanged with rare-earth cations if required, calcined, exchanged a second time with ammonium ions, and calcined a second time if required.

Especially preferred compositions of the solids in the slurries that are spray dried to form porous microspheres, and later optionally calcined at low temperature to prepare precursor reactive microspheres, are expressed hereinafter below in Table 1 as the weight percent of metakaolin and inerts including hydrated kaolin, calcined boehmite for metal passivation, and kaolin calcined through the exotherm (spinel or mullite) on a binder-free basis; weight % $SiO_2$ binder is based on the grams of SiO2 in the binder per gram of total weight of moisture-free spray dried microspheres and provided by sodium silicate. In general, the spray dried microspheres will have a size of from about 20 to 150 microns. Preferably, the size of the spray dried microspheres will range from about 50 to 100 microns and, more preferably, from about 65–90 microns.

TABLE 1

| Ingredients | Broad | Preferred | Most Preferred |
| --- | --- | --- | --- |
| Hydrated Kaolin | 5–80 | 10–75 | 15–70 |
| Metakaolin | 20–50 | 25–45 | 30–40 |
| Boehmite Alumina (calcined) | 0–30 | 10–25 | 15–25 |
| Kaolin calcined through the exotherm | 0–40 | 5–30 | 10–30 |
| Binder | 2–35 | 4–25 | 5–15 |

Hydrous kaolin is used as an inert in the slurry and acts as an alumina-containing matrix precursor of the catalyst. Thus, once crystallized, the zeolite catalyst will contain a silica-alumina matrix derived from the hydrous kaolin. The hydrous kaolin used as the alumina-containing matrix precursor of the catalytic microspheres is not singularly critical and can be obtained from a wide variety of commercial sources. The hydrous kaolin can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolins from Middle Georgia have been used with success. The particle size of the hydrous kaolin is generally known to have an impact on microsphere porosity, so the resultant crystallized catalyst macroporosity can be manipulated in part by manipulation of the hydrous kaolin particle size. The present assignee for example has shown that coarser hydrous kaolin yields higher macropore volume in microspheres. Since the present invention comprises several parameters that effect changes in catalyst macroporosity, there remains some flexibility in the choice of the hydrous kaolin particle size.

Calcination of these hydrous kaolins at temperatures of 1200° F. results in endothermic dehydroxylation of the hydrous kaolin to metakaolin which can be used as the metakaolin component of the feed slurry.

Silicate for the binder is preferably provided by sodium silicates with $SiO_2$ to $Na_2O$ ratios of from 1.5 to 3.5 and especially preferred ratios of from 2.00 to 3.22.

The non-zeolitic, alumina-containing matrix of the catalysts of the present invention can further be derived in part from a hydrous kaolin source that is in the form of an ultrafine powder that is pulverized and calcined through the exotherm. Typical zeolite microspheres have been formed with an alumina-containing matrix derived from kaolin having a larger size than used in this invention and which is calcined at least substantially through its characteristic exotherm. Satintone® No. 1, (a commercially available kaolin that has been calcined through its characteristic exotherm without any substantial formation of mullite) is a material used on a commercial basis to form the alumina-containing matrix. Satintone® No. 1 is derived from a hydrous kaolin in which 70% of the particles are less than 2 microns. Other sources having been used to form the alumina-containing matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet kaolin has found the most widespread commercial use and has met tremendous success worldwide. Before the invention disclosed in previously mentioned U.S. Ser. No. 09/956,250, these larger kaolin particles represented the state of the art in forming the alumina-containing matrix of the catalyst microsphere and had no perceived deficits.

What is meant by "ultrafine" powder is that at least 90 wt. % of the hydrous kaolin particles must be less than 2 microns in diameter, preferably less than 1 micron determined by Sedigraph™ (or sedimentation). It has been found that, in particular, use of hydrous kaolin pigments with this particle size distribution upon pulverization and calcination through the characteristic exotherm results in a greater quantity of macroporosity in the catalyst microsphere subsequent to zeolite crystallization. The loose packing of the calcined ultrafine kaolin, which has been found, can be likened to a "house of cards" in which the individual particulates are aligned randomly with respect to adjacent particles in a non-parallel manner. Moreover, the calcined ultrafine kaolin exists as porous aggregates of the "house of cards" morphology, providing not only a porous aggregate but additional porous areas between aggregates. Pulverization of the ultrafine hydrous kaolin is required to provide the random stacking of the individual kaolin platelets.

The pulverized ultrafine hydrous kaolin, optionally used to derive a portion of the alumina-containing matrix, is calcined through its characteristic exotherm with or without the formation of mullite. An especially preferred matrix source which can be used in this invention to form in part the macroporous zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et. al., the entire contents of which are herein incorporated by reference. The ultrafine hydrous matrix source is spray dried, pulverized and then calcined through the exotherm, optionally to mullite. The aforementioned U.S. Pat. No. 4,493,902 discloses calcining the kaolin to mullite until the X-ray diffraction intensities are comparable to a fully crystalline reference standard. While it is within the scope of the present invention to calcine the ultrafine hydrous kaolin beyond the exotherm such that the X-ray diffraction intensities are comparable to a fully crystalline referenced standard as disclosed in the '902 patent, it is preferred to calcine the ultrafine hydrous kaolin beyond the characteristic exotherm so as to convert the kaolin to small crystallite size mullite. The small crystallite size mullite has the appropriate diffraction lines and leached chemical composition of a fully crystalline mullite standard, but the diffractional lines are weaker inasmuch as the crystallites are smaller. The relationship between diffraction intensity/line width and crystallite size is well-known. It is preferred to calcine the kaolin beyond the exotherm to a small crystallite mullite matrix inasmuch as fully calcining the kaolin to mullite takes excessive time and temperature in practice. Furthermore, calcining kaolin beyond the exotherm to fully crystalline mullite can result in the macroporosity being lost due to sintering. Moreover, bulk density after calcining kaolin to fully crystalline mullite can be substantially increased. Thus, it is preferred that the ultrafine hydrous kaolin calcined through the exotherm has 20–80% of the integrated X-ray diffraction peak areas of a kaolin reference sample containing well crystallized mullite. More preferably, the ultrafine kaolin is calcined through the exotherm such that it has 50–70% of the integrated X-ray diffraction peak areas of fully crystallized mullite.

What is unusual about the use of the Ansilex® material is that it is derived from hard kaolin. Hard kaolins typically have a gray tinge or coloration and are, thus, also referred to as "gray clays". These hard kaolins are further characterized by breaking into irregularly shaped fragments having rough surfaces. Hard kaolins also contain a significant iron content, typically about 0.6 to 1 wt. % of $Fe_2O_3$. Hard kaolin clays are described in Grim's "Applied Clay Mineralogy", 1962, MaGraw Hill Book Company, pp. 394–398 thereof, the disclosure of which is incorporated by reference herein. The use of these materials to form part of the alumina-containing matrix for in situ FCC microsphere catalysts has not been known previous to U.S. Ser. No. 09/956,250 although their use in the incorporated routes is well established. Hard kaolins have also occasionally been used as sources of metakaolin for in situ microspheres, but not with advantage. Without wishing to be bound by any theory, it would appear that previous use of the calcined gray clays in the in situ matrix art would be precluded by (a) the high iron content thereof and the possibility that this could lead to coke and gas production, and (b) the dilatant nature of slurries formed therefrom, leading to apparently senseless waste of process time and increased cost in making down high viscosity slurries which spray dry at low solids. We now believe these dilatancy problems and porosity benefits are intrinsically and fundamentally linked. As for the former point, reduced coke and gas was an especially sought-after object for in situ catalysts, since the original formulations of Haden made coke and gas commensurate with their extraordinarily high level of amorphous matrix activity. This led to lower and lower levels of iron and spinel in subsequent inventions. It is a surprising finding that there appears to be no relationship between the iron and coke and gas selectivities after all. Instead, substantial improvements in FCC dry gas and coke were obtained through process modifications like improved feed injection and riser termination devices reducing contact time.

The matrix can be derived at least in part from alumina-containing materials more generally characterized by the porosity thereof provided during the packing of the calcined material. A test has been developed to determine the pore volume of the calcined alumina-containing material which can be used to ultimately form a part of the matrix of the inventive catalyst. The test characterizes the water pore volume of the calcined alumina-containing material by determining the minimum amount of water needed to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud which only just begins to flow under its own weight. The incipient slurry point (ISP) is calculated from the weights of the sample and water used. The incipient slurry point can be calculated as follows: ISP=[(grams of dry sample)/(grams of dry sample plus grams of water added)]× 100. The units are dimensionless and are reported as percent solids.

This amount of water is larger than the (internal) water pore volume of the sample, but is clearly related to the water pore volume. Lower incipient slurry point percent solids values indicate higher water absorption capacities or higher pore volume in the sample. The calcined alumina-containing materials from which the high-alumina matrix can be at least in part derived in accordance with this invention will have incipient slurry points less than 57% solids, preferably 48 to 52% solids. This compares with Satintone® No. 1 which yields over 58% solids in the incipient slurry point test.

Accordingly, not only is the ultrafine hydrous kaolin useful as an alumina-containing material which can be used to derive a portion of the matrix of the catalyst microspheres, but the matrix may also be derived in part from delaminated kaolin, platelet alumina and precipitated alumina. Means for delaminating booklets or stacks of kaolin are well-known in the art. Preferred are those methods, which use a particulate grinding medium such as sand, or glass microballoons as is well-known. Subsequent to delamination, the platelets are pulverized to derive the random packing or "house of cards" morphology.

An advantage of the matrix precursors meeting the ISP test specification is that they bring higher pore volume per unit matrix surface area. This maximizes the effectiveness of the catalyst by minimizing both catalytic coke (pore volume) and contaminant coke (matrix surface area).

It is also within the scope of this invention to derive the matrix in part from chemically synthesized spinel and/or mullite. Thus, Okata, et al., "Characterization of spinel phase from $SiO_2$—$_2O_3$ xerogels and the formation process of mullite", Journal of the American Ceramic Society, 69 [9] 652–656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallized mullite directly from the amorphous state on firing whereas the xerogels formed by rapid hydrolysis crystallized a spinel phase before mullite formation. As long as such calcined synthetic materials have a water pore volume within the scope of this invention, such materials can be used to derive at least in part the high-alumina matrix of the catalyst of this invention.

In order to passivate contaminant metals, such as nickel and vanadium, the catalyst matrix may further include an alumina source derived from highly dispersible boehmite. Other aluminas such as pseudo-boehmite with low dispersibility, and gibbsite can be used, but are not as effective. Dispersibility of the hydrated alumina is the property of the alumina to disperse effectively in an acidic media such as formic acid of pH less than about 3.5. Such acid treatment is known as peptizing the alumina. High dispersion is when 90% or more of the alumina disperses into particles less than about 1 micron.

The surface area (BET, nitrogen) of the crystalline boehmite, as well as the gamma-delta alumina conversion product, upon calcination is below 150 $m^2/g$, preferably below 125 $m^2/g$, and most preferably below 100 $m^2/g$, e.g. 30–80 $m^2/g$.

Following are typical properties of fully peptizable and dispersible crystalline boehmites which can be used in practice of the invention

| | |
|---|---|
| $Al_2O_3$ wt % | 99.0 min. (ignited) |
| Carbon wt % | 0.5 max. |
| $SiO_2$ wt % | 0.015 max. |
| $Fe_2O_3$ wt % | 0.015 max. |
| $Na_2O$ wt % | 0.005 max. |
| Surface Area ($m^2/g$) | (before calcination) 30–80 |
| Pore volume, cc/g | 70% in pores having radii from 100 to 1,000 Å units |
| Total volatiles | ~20 wt. % max. |
| Pore size diameter | 150–1,000 Å |

Monoprotic acids, preferably formic, can be used to peptize the crystalline boehmite. Other acids that can be employed to peptize the alumina are nitric and acetic.

During production, the crystalline boehmite is calcined prior to incorporation into the microsphere. As a result of calcination, the crystalline boehmite is converted to a porous gamma phase and to a lesser extent a delta alumina. The BET surface area of this material only increases marginally, e.g., increases from 80 $m^2/g$ to 100 $m^2/g$. The calcined boehmite converted to the gamma phase is added to the slurry of hydrous kaolin, metakaolin, and other alumina matrix components and spray dried into the microspheres. Upon zeolite crystallization, the gamma alumina will not be leached from the microspheres by the alkaline silicate solution. When the dispersed alumina solution is calcined and spray dried with the kaolin and binder, the resulting microsphere contains uniformly distributed gamma alumina throughout the microsphere.

Preferably, the pore volume of the crystallized zeolite microsphere of this invention, which is formed using hydrous kaolin to form the catalyst matrix, is greater than 0.15 cc/gm, more preferably greater than 0.25 cc/gm, and most preferably greater than 0.30 cc/gm of Hg in the range of 40–20,000 Å diameter. More particularly, the catalyst of this invention has a macropore volume within pores having a size range of 600 to 20,000 Å of at least 0.07 cc/gm of Hg, and preferably at least 0.10 cc/gm of Hg. While conventional zeolite-incorporated catalysts have macroporosities comparable to the catalysts of this invention, the incorporated catalysts do not have the novel zeolite-on-matrix morphology nor performance of the catalysts of this invention. The catalysts of this invention will have a BET surface area less than 500 $m^2/g$, preferably less than 475 $m^2/g$ and most preferably within a range of about 300–450 $m^2/g$. The moderate surface area of the catalysts of this invention in combination with the macroporosity achieves the desired activity and selectivities to gasoline while reducing gas and coke yields.

One skilled in the art will readily appreciate that it is the steam-aged surface area and activity that is truly significant and which must be balanced against the available pore volume. The cited preferred surface areas for finished product (fresh) catalyst are chosen such that the surface area after a 1500° F., four hour steaming at 1 atm steam pressure are generally below 300 m2/gm.

It has further been found that the macroporosity of the catalyst of this invention is maintained even if a portion of the matrix is derived from calcined or additional coarse alumina-containing materials which otherwise have a low water pore volume as determined by the ISP test described above.

A quantity (e.g., 3 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres may be calcined at low temperature, e.g., for two to four hours in a muffle furnace at a chamber temperature of less than 1000° F. It is important that during calcination the hydrated kaolin component of the microspheres is not converted to metakaolin, leaving the hydrous kaolin, and optional spinel or gamma alumina components of the microspheres essentially unchanged. Alternatively, if the microspheres are formed with a sodium silicate binder, the microspheres may be acid-neutralized to enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subsequently filtered and washed free from the microspheres. The silica gel-bound microspheres are then calcined at low tempature.

Y-faujasite is allowed to crystallize by mixing the kaolin microspheres with the appropriate amounts of other constituents (including at least sodium silicate and water), as discussed in detail below, and then heating the resulting slurry to a temperature and for a time (e.g., to 200°–215° F. for 10–24 hours) sufficient to crystallize Y-faujasite in the microspheres. The prescriptions of U.S. Pat. No. 4,493,902 may be followed as written. Equivalent, reformatted recipes are provided as follows, however.

The crystallization recipes we employ are based on a set of assumptions and certain raw materials. The seeds are described by U.S. Pat. No. 4,631,262 and are preferably used externally. The SiO2, Al2O3, and Na2O components of metakaolin, seeds, sodium silicate solution, calcined sodium silicate binder, and silica gel are assumed to be 100% reactive. The silica-alumina and alumina derived from the hydrous kaolin and calcined boehmite, respectively, are assumed to be completely unreactive for zeolite synthesis. The alumina and silica in kaolin calcined through the exotherm to the spinel form are assumed to be 1% and 90% reactive respectively. Although these two values are in use, they are not believed to be accurate. The alumina and silica in kaolin calcined through the exotherm to the mullite form are assumed to be 0% and 67% reactive, respectively. These two values are believed to be accurate, representing the inertness of 3:2 mullite in crystallization and the full solubility of the free silica phase. Since metakaolin alumina is the limiting reagent in the synthesis and the volume of zeolite is much larger than the corresponding volume of metakaolin, it is important to limit the zeolite yield appropriately for a given microsphere pore volume. Otherwise, there will result little or no residual pore volume after crystallization. Such is the case for the prior art. On the other hand, if insufficient limiting reagent is available in the microsphere to grow sufficient zeolite to appropriately strengthen the catalyst, additional nutrient alumina may be added in the form of metakaolin microspheres, as is well known in this art. Thus, tight process control is enabled for pore volume and attrition resistance.

Using these assumptions, the following weight ratios for reactive components are used in the overall crystallization recipes. Inert components do not enter into the ratios, except in the case of the seeds dose, which is defined as the ratio of the grams of seeds Al2O3 to total grams of microspheres.

| Weight Ratios | $SiO_2/Na_2O$ | $SiO_2/Al_2O_3$ | $H_2O/Na_2O$ | Seeds $Al_2O_3/MS$ |
|---|---|---|---|---|
| Broadly | 2.50–3.1 | 4.5–15 | 5–15 | .01–0.0001 |
| Preferred | 2.55–2.95 | 5.5–8 | 5.5–8 | 0.006–0.001 |
| Typical | 2.75 | 7.0 | 7.0 | 0.004 |
| (Acid-neut.) | 2.9 | | | |

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the microspheres containing Y-faujasite are separated from at least a substantial portion of their mother liquor, e.g., by filtration. It may be desirable to wash to microspheres by contacting them with water either during or after the filtration step. The purpose of the washing step is to remove mother liquor that would otherwise be left entrained within the microspheres.

"Silica Retention" may be practiced. The teachings of U.S. Pat. No. 4,493,902 at column 12, lines 3–31, regarding silica retention are incorporated herein by cross-reference.

After crystallization by reaction in a seeded sodium silicate solution, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight $Na_2O$. After ion exchange, the microspheres are dried to obtain the microspheres of the present invention. In order to make 0 (zero) wt. % rare earth (REO) catalysts, the $Na^+$ cations are exchanged by using only an ammonium salt such as $NH_4NO_3$ and without using any rare earth salt during exchange. Such 0 (zero) wt. % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated. Following ammonium and rare earth exchange, the catalyst is calcined at 1100°–1200° F. for 1–2 hours and unit cell size of the Y zeolite is reduced. Preferably, this calcination is done in a covered tray with 25% free moisture present.

The preferred catalyst of the invention comprises microspheres containing at least 15% and preferably from 40 to 65% by weight Y faujasite, expressed on the basis of the as-crystallized sodium faujasite form zeolite. As used herein, the term Y faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titled "Determination of the Unit Cell Size Dimension of a Faujasite Type Zeolite" (Designation D3942-80) or by an equivalent technique. The term Y faujasite shall encompass the zeolite in its sodium form as well as in the known modified forms, including, e.g., rare earth and ammonium exchanged forms and stabilized forms. The percentage of Y faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906–80) or by an equivalent technique. It is important to equilibrate the microspheres carefully before X-ray evaluations are made since equilibration can have a significant effect on the results.

It is preferred that the Y-faujasite component of the microspheres, in their sodium form, have a crystalline unit cell size of less than about 24.73 Å and most preferably less than about 24.69 Å.

Table 2 below sets forth ranges for the chemical composition and surface areas of catalysts formed in accordance with this invention.

TABLE 2

Range of chemical compositions, surface areas and UCS for invention catalyst

|  | Range | |
|---|---|---|
|  | Low | High |
| $SiO_2$, wt. % | 35 | 65 |
| $Al_2O_3$, wt. % | 30 | 60 |
| TSA, $m^2/g$ | 300 | 475 |
| MSA, $m^2/g$ | 60 | 120 |
| ZSA, $m^2/g$ | 190 | 415 |
| UCS, A | 24.40 | 24.72 |

Conditions useful in operating FCC units utilizing catalyst of the invention are well-known in the art and are contemplated in using the catalysts of the invention. These conditions are described in numerous publications including Catal. Rev. —Sci. Eng., 18 (1), 1–150 (1978), which is incorporated herein by cross-reference. The catalysts of this invention that contain the calcined dispersable boehmite are particularly useful in cracking residuum and resid-containing feeds having a Ni+V metals content of at least 2,000 ppm and a Conradson carbon content greater than 1.0.

The catalyst of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

From the prior art discussed previously, it was thought that the less porous catalyst microspheres were superior products in view of the excellent attrition resistance, high activity and selectivity provided, especially in light of the well established fact that these catalysts have selectivity at least equivalent to lower surface area, higher pore volume catalysts, and frequently better selectivity at short contact time. Assertions to the contrary would easily be dismissed as self-serving and would also be tantamount to saying the so-called incorporated catalysts were diffusion-limited at short residence time. It has only recently been discovered that under the short contact time FCC processing, FCC catalysts technologies may be diffusion limited with respect to transport in pores external to the zeolite. This is proposed to be the reason that the API gravity of the bottoms fraction has often risen after SCT revamp. Less obvious than that, it now appears that conventional, prior art catalysts fail to provide all of the potential gains of the SCT hardware. But heretofore there was no way to know what benefits were absent. Accordingly, the catalyst microspheres of this invention have a substantially different morphology than the previous catalyst microspheres, especially with respect to the increased pore volume, zeolite-on-matrix morphology, and moderate surface area. Attrition resistance of these catalysts is good and effective for the SCT FCC processing conditions.

The method of preparation and subsequent properties such as mercury pore volume, the catalyst of this invention includes a macroporous matrix in which the macropores of the matrix are formed from a random configuration of porous matrix planar structures which are lined with the zeolite crystals. Thus, the macropores of the catalyst are lined with the active zeolite crystals. The macroporosity of the catalyst allows the hydrocarbons to enter the catalyst freely and the increased macropore surface area thereof allows such hydrocarbons to contact the catalytic surfaces. Importantly, the hydrocarbons can contact the zeolite unobstructed, rendering the catalyst very active and selective to gasoline. While conventional incorporated zeolite catalysts, in which the zeolite crystals are incorporated within a binder and/or matrix, have a highly porous matrix, at least a portion of the binder coats or otherwise obstructs the zeolite crystals. In the present microspheroidal catalysts, there is no need for a separate physical binder which glues the zeolite to the matrix surface other than any minute amounts of silicate which may remain subsequent to zeolite crystallization. It is believed that the microsphere catalysts formed in accordance with the process of the present invention yield the highest accessibility to the zeolite of any zeolite/matrix catalyst.

Also optionally present in a highly dispersed state are the particles of metal-passivating alumina. While there is a preponderance of zeolite lining the macropore walls of the invention, smaller particles presumed to be formed from the dispersed boehmite and/or mullite are also seen.

It has been found that the microspheroidal catalysts of the present invention provide high conversions via low coke selectivity and higher selectivities to gasoline relative to previous FCC catalysts presently on the market. It is surprising that this catalyst can consistently outperform conventional incorporated catalysts of similar or even higher porosity and lower surface area. This shows that having added porosity alone is not sufficient. It is now believed that the novel structured catalysts, being both macroporous and with the macropore walls lined with zeolite and with the mesoporous or microporous matrix substantially behind the zeolite layer are the reasons the catalyst excels at gasoline, LCO and coke selectivity. The present catalyst is sufficient to crack the heavier hydrocarbons and anticipated to improve the API gravity of the bottom fraction, especially during the short contact time processing.

The examples, which follow, illustrate the present invention:

EXAMPLE 1

The microspheres of this Example were made in a pilot plant with nozzle-type atomizer. The following components as set forth in Table 3 were mixed in a Cowles mixer and spray dried. The sodium silicate was added directly to the slurry, resulting in flocculation. Solids were adjusted appropriately in order to enable spray drying.

TABLE 3

| | |
|---|---|
| Metakaolin (MetaMax EF) | 30% |
| ASP-200 hydrous kaolin | 70% |
| Silicate binder (as $SiO_2$)[1] | 15% |

[1] 3.22 $SiO_2/Na_2O$

The microspheres were calcined at 700° F. for 4 hours before further use.

EXAMPLES 2 AND 3

Two reactions were run to grow zeolite in the microsphere of Example 1 with and without the addition of a microsphere containing 100% metakaolin to adjust zeolite content. The reaction components for each example are shown in Table 4.

TABLE 4

| | Example 2 | Example 3 |
|---|---|---|
| Microsphere | Example 1 | Example 1 |
| grams microsphere | 500 | 905 |
| grams of metakaolin-only microsphere | 0 | 45 |
| grams seeds | 379 | 697 |
| grams N-brand (silicate) | 863 | 1908 |
| grams 50% caustic | 70 | 162 |
| grams water | 440 | 880 |
| Crystallization, hour | 24.5 | 25 |
| Zeolite Index | 39 | 41 |
| ABD, g/cc | / | 0.71 |

The corresponding ratios of reactive components were $SiO_2/Na_2O$=2.70 w/w, $H_2O/Na_2O$=7.0 w/w, $SiO_2/Al_2O_3$=7.0 w/w and seeds $Al_2O_3$/grams microsphere of 0.0044 w/w. The as-crystallized sample of Example 2 had a Hg pore volume of 0.31 cc/g (40–20K pore diameter).
Properties of the finished product of Example 3 were as follows:

| | TSA m2/g | MSA m2/g | Na$_2$O Wt % | ReO Wt % | SiO$_2$ Wt % | Al$_2$O$_3$ Wt % | ucs A | HgPV cc/g (40–20K in dia.) |
|---|---|---|---|---|---|---|---|---|
| Finished product | 396 | 65 | 0.49 | 3.38 | 62.6 | 31.0 | 24.563 | 0.35 |

EXAMPLES 4 AND 5

The microspheres of Examples 4 and 5 contain ultrafine kaolin(Ansilex 93®) calcined through the characteristic exotherm and were spray dried at a Pilot plant with a wheel-type atomizer. The weight percentages of each component forming the spray dried slurry are shown in Table 5. The weight percentage of each kaolin component is on a binder-free basis.

TABLE 5

| | Example 4 | Example 5 |
|---|---|---|
| Metakaolin (MetaMax EF) | 40 | 40 |
| DMF hydrous kaolin[1] | 45 | 30 |
| Ansilex 93 ® | 15 | 30 |
| Silicate binder (as $SiO_2$) | 15 | 15 |

[1] Engelhard Corporation, USA. 70% <2 um by sedimentation hydrous kaolin.

The spray dried microspheres were calcined at 700° F. for 4 hours before further use.

EXAMPLES 6 AND 7

Two reactions were run to grow zeolite using the microspheres of Examples 4 and 5. The reaction components for each example are shown in Table 6.

TABLE 6

| | Example 6 | Example 7 |
|---|---|---|
| Microsphere | Example 4 | Example 5 |
| grams microsphere | 750 | 750 |
| grams seeds | 516 | 516 |
| grams N-Brand | 1361 | 1215 |
| grams 50% caustic | 166 | 187 |
| grams water | 726 | 772 |
| Crystallization time, h | 23 | 20 |
| $SiO_2/Na_2O$ | 2.80 | 2.85 |
| $H_2O/Na_2O$ | 7.0 | 7.0 |
| $SiO_2/Al_2O_3$ | 7.0 | 7.0 |

Properties of the finished products of Examples 6 and 7 are shown below.

| | TSA m2/g | MSA m2/g | Na2O wt % | ReO wt % | SiO2 wt % | Al2O3 wt % | ucs A | Roller | HgPV (40–20K in dia.) c/g |
|---|---|---|---|---|---|---|---|---|---|
| Example 6 | 390 | 77 | 0.49 | 3.03 | 60.51 | 33.44 | 24.526 | 11 | 0.40 |
| Example 7 | 397 | 81 | 0.34 | 3.25 | 59.0 | 35.33 | 24.513 | 13 | 0.39 |

The finished products of Examples 3, 6, and 7 show similar macropore size distribution with peak maxima in the range of 500–700 Å in radius. The introduction of Ansilex- 93® gives rise to an increased pore volume in the range of 25–30 Å pore radius.

All of the above catalyst examples did not contain metal tolerant alumina and are intended for cracking of a feed with a minimum metals content.

EXAMPLES 8 AND 9

These examples disclose the preparation of microsphere containing metal tolerant alumina. In general, metal tolerant highly dispersable boehmite was first calcined at 1450° F. for 2 h to gamma alumina. The gamma alumina was then milled to reduce APS to about 2 microns in aqueous media. The milled gamma alumina slurry, either peptized or not, was added to a slurry containing metakaolin, hydrous kaolin, and Ansilex-93® when applicable, in a Cowles mixer. Sodium silicate (3.22 SiO2/Na2O) was then added into the slurry, along with sufficient water to form a mixture suitable for atomization. The slurry was spray dried in a pilot plant with a wheel-type atomizer. The weight percentages of each component of the slurry are set forth in Table 7. Again, the percentages of the alumina components are on a binder-free basis.

TABLE 7

|  | Example 8 | Example 9 |
| --- | --- | --- |
| Metakaolin (MetaMax EF) | 37.5 | 40.0 |
| DMF hydrous kaolin | 42.5 | 30.0 |
| A93 ® | 0.0 | 10.0 |
| Calcined and milled alumina | 20.0 | 20.0 |
| Sodium silicate (as SiO$_2$) | 15.0 | 15.0 |

The spray dried microspheres were calcined at 700° F. for 4 h and were used for the following crystallization.

EXAMPLES 10 AND 11

The microspheres of Examples 8 and 9 were reacted with the components shown in Table 8.

TABLE 8

|  | Example 10 | Example 11 |
| --- | --- | --- |
| microsphere | Example 8 | Example 9 |
| grams microsphere | 750 | 750 |
| grams seeds | 516 | 516 |
| grams N-Brand | 1367 | 1409 |
| grams 50% caustic | 124 | 147 |
| grams water | 638 | 687 |
| SiO$_2$/Na$_2$O | 2.775 | 2.825 |
| H$_2$O/Na$_2$O | 7.0 | 7.0 |
| SiO$_2$/Al$_2$O$_3$ | 7.0 | 7.0 |
| Crystallization time, h | 24.5 | 22.5 |

The properties of the finished product of Examples 10 and 11 are shown below.

EXAMPLES 12–16

These examples measure the performance of the catalysts of the present invention (Examples 3, 6, and 7) against that of two comparative examples. The two comparative examples represent the catalysts of U.S. Ser. No. 09/956,250 (Comparative 1) and U.S. Pat. No. 5,395,908 (Comparative 2. The catalyst samples were laboratory deactivated at 1450° F. for 4 h in 100% steam. The deactivated catalysts were then tested in an ACE™ fluidized bed test unit at 970° F. with 1.125" injector height with an aromatic feed having a Conradson carbon of about 6%. The activity was changed by changing the amount of active FCC catalyst. The total amount of inert microspheres and active catalyst in the ACE unit was kept constant at 12.0 g. The yields are reported at 70% convention.

|  | Example | | | | |
| --- | --- | --- | --- | --- | --- |
|  | 12 | 13 | 14 | 15 | 16 |
| catalyst | Example 3 | Example 6 | Example 7 | Comparative 1 | Comparative 2 |
| LPG | 13.46 | 13.31 | 13.09 | 13.21 | 13.90 |
| Gasoline | 46.46 | 47.26 | 47.16 | 47.19 | 46.01 |
| LCO | 17.50 | 18.29 | 18.33 | 18.06 | 17.44 |
| Coke | 8.41 | 7.90 | 8.13 | 7.89 | 8.38 |

Compared to the Comparative 2 sample, the current invention clearly demonstrates the improved gasoline yield and bottom cracking, especially in the presence of small amounts of bottom upgrading matrix (spinel and/or mullite) in the microsphere. In general, the presence of macroposity and bottom upgrading matrix (spinel and/or mullite) greatly improves the yields of the desired products.

EXAMPLES 17–21

Examples below measure the performance of catalysts of the present invention (Examples 10 and 11) against catalysts of U.S. Ser. No. 09/956,250 (Comparative 3), U.S. Ser. No. 09/978,180, filed Oct. 17, 2001 (Comparative 4), and U.S. Ser. No. 10/164,488, filed Jun. 6, 2002 (Comparative 5). Comparative catalysts 4 and 5 represent a class of catalysts for residuum cracking. The catalyst samples were presteamed at 1350° F. for 2 h in 100% steam, and 3000/3000 PPM Nickel and Vanadium were added via incipient wetness using nickel octoate and vanadium naphthenate, followed by poststeaming at 1450° F. for 4 h in a mixture of 90% steam and 10% air. The performance of each catalyst was then measured using ACE following the protocols described in the above Examples. Yields were compared at 70% conversion.

|  | TSA | MSA | Na2O | ReO | SiO2 | Al2O3 | ucs | Roller | HgPV |
| --- | --- | --- | --- | --- | --- | --- | --- | --- | --- |
| Example 10 | 362 | 64 | 0.41 | 3.59 | 53.72 | 40.34 | 24.567 | 7 | 0.34 |
| Example 11 | 394 | 72 | 0.33 | 3.58 | 52.28 | 40.28 | 24.567 | 13 | 0.37 |

|  | Example | | | | |
|---|---|---|---|---|---|
|  | 17 | 18 | 19 | 20 | 21 |
| Catalyst | Example 10 | Example 11 | Comparative 3 | Comparative 4 | Comparative 5 |
| H2 | 0.44 | 0.50 | 0.83 | 0.58 | 0.53 |
| LPG | 13.03 | 13.01 | 12.50 | 13.31 | 12.40 |
| Gasoline | 44.03 | 43.57 | 41.69 | 42.16 | 44.32 |
| LCO | 17.72 | 18.01 | 18.45 | 16.98 | 18.44 |
| Coke | 11.05 | 11.40 | 13.43 | 12.13 | 11.15 |

The catalysts of current invention show dramatic improvement in gasoline yield and bottom upgrading compared to comparative samples 3 and 4. The inventive catalysts also provide the lowest H2 yield among the catalysts tested, indicating better metal passivation.

EXAMPLES 22–24

These examples also show improved metal passivation of the catalysts of the present invention against the Comparative 5 catalyst and a commercial resid catalyst (Comparative 6). The ACE data were generated from the catalysts deactivated in a different way compared to those in Examples 17–21. The three samples were laboratory deactivated in a prestream, fluid bed crack on nickel and vanadium, post steam deactivation protocol. Typical Ni and V loadings were 2800 PPM and 3600 PPM respectively. The deactivated catalysts were then tested in an ACE unit at 8 WHSV, 2.125" injector height, and 998° F. crack temperature with the same feed as that used in the examples above. The amount of catalyst in the ACE unit was constant at 9.0 g and the activity was changed by changing the amount of oil delivered. Product yields were given at 75% conversion.

|  | Example | | |
|---|---|---|---|
|  | 22 | 23 | 24 |
| Catalyst | Example 10 | Comparative 5 | Comparative 6 |
| H2 | 0.55 | 0.74 | 0.65 |
| LPG | 14.46 | 13.63 | 15.45 |
| Gasoline | 46.6 | 47.0 | 42.8 |
| LCO | 15.16 | 16.14 | 15.15 |
| Coke | 11.25 | 11.42 | 13.41 |

Again, the catalyst of current invention results in a dramatic improvement in metal passivation as indicated by the low H2 yield. The catalyst of Example 10 contains no bottom cracking matrix such as spinel or mullite. Modification of this catalyst with the addition of small amounts of spinel and/or mullite would improve the bottom upgrading with little or no penalty in metal passivation.

What is claimed is:

1. A zeolitic fluid catalytic cracking catalyst comprising:
   (a) at least about 40% by weight of an aluminosilicate zeolite crystallized in-situ from a metakaolin-containing calcined reactive microsphere; and
   (b) an alumina-containing matrix formed from hydrous kaolin contained in said reactive microsphere, said calcined reactive microsphere containing at least 5 wt. % hydrous kaolin.

2. The catalyst of claim 1 wherein said reactive microsphere has a size from 20 to 150 microns.

3. The catalyst of claim 2 wherein said reactive microsphere has a size from about 50 to 100 microns.

4. The catalyst of claim 1 wherein said metakaolin-containing reactive microsphere is formed by spray drying an aqueous slurry comprising metakaolin and hydrous kaolin.

5. The catalyst of claim 4 wherein said aqueous slurry further includes a silica or silicate binder.

6. The catalyst of claim 1 wherein said alumina-containing matrix is further obtained by a calcined dispersible boehmite contained in said reactive microsphere.

7. The catalyst of claim 6 wherein said calcined dispersible boehmite comprises gamma alumina.

8. The catalyst of claim 7 wherein said calcined dispersible boehmite comprises a combination of transitional gamma and delta phases.

9. The catalyst of claim 6 wherein said dispersible boehmite is characterized by having at least 90% of said boehmite dispersed into particles less than about 1 micron in an acidic media of pH less than about 3.5.

10. The catalyst of claim 1 wherein said alumina-containing matrix is further obtained from a calcined kaolin derived from a pulverized, ultra fine hydrous kaolin wherein 90 weight % of said ultra fine kaolin is in particles having a diameter of less than 2 microns, said calcined kaolin being contained within said reactive microsphere.

11. The catalyst of claim 10 wherein said calcined kaolin has been calcined through its characteristic exotherm with or without formation of mullite.

12. The catalyst of claim 11 wherein said calcined kaolin has been calcined through its characteristic exotherm to spinel.

13. The catalyst of claim 11 wherein said calcined kaolin has been calcined through its characteristic exotherm to mullite.

14. The catalyst of claim 13 wherein said calcined kaolin, calcined through its characteristic exotherm, has 20–80% of the integrated x-ray diffraction peak areas of fully crystallized mullite.

15. The catalyst of claim 11 wherein said calcined kaolin has been calcined through its characteristic exotherm to comprise both spinel and mullite.

16. The catalyst of claim 1 wherein said reactive microsphere comprises based on the alumina-containing components 5–80 wt. % hydrous kaolin, 20–50 wt. % metakaolin, 0–30 wt. % calcined boehmite, and 0–40 wt. % of a kaolin which has been calcined through the characteristic exotherm.

17. The catalyst of claim 16 wherein said reactive microsphere further contains 2–35 weight % of a binder based on the weight of the microsphere.

18. The catalyst of claim 16 wherein said reactive microsphere contains calcined boehmite in an amount up to 30 wt. % relative to the alumina-containing components, said calcined boehmite comprising a transitional gamma phase.

19. The catalyst of claim 16 wherein said calcined boehmite comprises a combination of transitional gamma and delta phases.

20. The catalyst of claim 16 wherein said boehmite is a dispersible boehmite characterized by having at least 90% of said boehmite dispersed into particles less than 1 micron in an acidic media of pH less than about 3.5.

21. The catalyst of claim 16 wherein said calcined kaolin is derived from a pulverized, ultra fine hydrous kaolin wherein 90 weight % of said ultra fine kaolin is in particles having a diameter of less than 2 microns.

22. The catalyst of claim 21 wherein said calcined kaolin has been calcined through its characteristic exotherm to spinel.

23. The catalyst of claim 21 wherein said calcined kaolin has been calcined through its characteristic exotherm to mullite.

24. The catalyst of claim 21 wherein said calcined kaolin has been calcined through its characteristic exotherm to comprise both spinel and mullite.

25. The catalyst of claim 21 wherein said calcined kaolin has been calcined through its characteristic exotherm so as to have 20–80% of the integrated x-ray diffraction peak areas fully crystallized mullite.

26. The catalyst of claim 18 wherein said reactive microsphere further contains a calcined kaolin in an amount up to 40 wt. % relative to the alumina-containing components, said calcined kaolin being derived from a pulverized, ultra fine hydrous kaolin where 90 weight % of said ultra fine kaolin is in particles having a diameter of less than 2 microns.

27. The catalyst of claim 26 wherein said reactive microsphere comprises 10–75 wt. % hydrous kaolin, 25–45 wt. % metakaolin, 10–25 wt. % calcined boehmite, and 5–30 wt. % of said calcined kaolin, said percentages being based upon the weight of alumina-containing components.

28. The catalyst of claim 27 wherein said reactive microsphere comprises 15–70 wt. % hydrous kaolin, 30–40 wt. % metakaolin, 15–25 wt. % calcined boehmite, and 10–30 wt. % of said calcined kaolin.

29. The catalyst of claim which has a mercury pore volume of greater than 0.15 cc/gm in a pore diameter range of 40–20,000 angstroms.

30. The catalyst of claim 29 having a mercury pore volume of greater than 0.25 cc/gm in a pore diameter range of 40–20,000 angstroms.

31. The catalyst of claim 29 having a mercury pare volume of greater than 0.30 cc/gm in the pore diameter range of 40–20,000 angstroms.

32. The catalyst of claim 1 wherein said aluminosilicate zeolite is Y-faujasite.

33. The catalyst of claim 32 wherein said Y-faujasite is ion-exchanged to reduce the sodium content of said catalyst to less than 0.7% by weight $Na_2O$.

34. The catalyst of claim 32 wherein said Y-faujasite is a product of ammonium exchange.

35. The catalyst of claim 32 wherein said Y-faujasite is exchanged with rare earth cations to provide a rare earth level as REO of 0.1–12 wt. %.

36. A fluid catalytic cracking catalyst comprising catalytic microspheres containing at least about 40% by weight Y-faujasite crystallized in-situ from a metakaolin-containing calcined reactive microsphere, said catalytic microspheres having a mercury porosity of greater than about 0.15 cc/g for pores having diameter in a range of 40–20,000 angstroms, said catalytic microspheres comprising:

a non-zeolitic, alumina-containing matrix derived from hydrous kaolin contained in said calcined reactive microspheres, said calcined reactive microspheres containing at least 5 wt. % hydrous kaolin.

37. The fluid catalytic cracking catalyst of claim 36 wherein said alumina-containing matrix is further derived from an alumina-containing precursor having an incipient slurry point of less than 57% solids.

38. The fluid catalytic cracking catalyst of claim 37 wherein said alumina-containing precursor has an incipient slurry point of no more than 52% solids.

39. The fluid catalytic cracking catalyst of claim 36 wherein said non-zeolitic alumina-containing matrix is further derived from a calcined dispersible boehmite contained in said reactive microsphere.

40. The fluid catalytic cracking catalyst of claim 37 wherein said non-zeolitic alumina-containing matrix is further derived from a calcined dispersible boehmite contained in said reactive microsphere.

41. The fluid catalytic cracking catalyst of claim 36 having a mercury porosity of greater than 0.30 cc/g for pores having diameters in the range of 40–20,000 angstroms.

42. The fluid catalytic cracking catalyst of claim 37 having a mercury porosity of greater than 0.30 cc/g for pores having diameters in the range of 40–20,000 angstroms.

43. The fluid catalytic cracking catalyst of claim 39 having a mercury porosity of greater than 0.30 cc/g for pores having diameters in the range of 40–20,000 angstroms.

44. The fluid catalytic cracking catalyst of claim 40 having a mercury porosity of greater than 0.30 cc/g for pores having diameters in the range of 40–20,000 angstroms.

45. The fluid catalytic cracking catalyst of claim 36 wherein said reactive microsphere comprises 10–80 wt. % of hydrous kaolin relative to the alumina-containing components of said reactive microsphere.

46. The fluid catalytic cracking catalyst of claim 36 containing 0.1–12 wt. % of rare earth oxides.

47. The fluid catalytic cracking catalyst of claim 39 wherein said calcined dispersible boehmite comprises a transitional gamma phase.

48. The fluid catalytic cracking catalyst of claim 39 wherein said calcined dispersible boehmite comprises a combination of transitional gamma and delta phases.

49. The fluid catalytic cracking catalyst of claim 39 wherein said dispersible boehmite is characterized by having at least 90% of said boehmite dispersed into particles less than 1 micron in an acidic media of pH of less than 1.5.

50. A process of forming a fluid catalytic cracking catalyst comprising:
(a) spray drying an aqueous slurry comprising hydrous kaolin and metakaolin to form reactive microspheres having a diameter in the range of from 20–150 microns, and calcining said reactive microsphere, said calcined reactive microsphere containing at least 5 wt. % hydrous kaolin; and
(b) reacting said spray dried, calcined microspheres with an aqueous alkaline silicate solution at a temperature and a time to form in-situ at least 40 wt. % crystallized Y-faujasite from said reactive microspheres.

51. The process of claim 50 wherein said aqueous slurry further includes a binder.

52. The process of claim 51 wherein said binder comprises silica or silicate binder.

53. The process of claim 50 wherein said spray dried microspheres are calcined at a temperature of less than 10000° F. prior to reacting such spray dried microspheres with said aqueous alkaline silicate solution.

54. The process of claim 50 wherein said aqueous slurry optionally contains a calcined dispersible boehmite or a kaolin calcined through the characteristic exotherm.

55. The process of claim 54 wherein said aqueous slurry includes both of said calcined boehmite and said calcined kaolin.

56. The process of claim 54 wherein said aqueous slurry contains 5–80 wt. % hydrous kaolin, 20–50 wt. % metakaolin, 0–30 wt. % calcined boehmite, and 0–40 wt. % of said calcined kaolin.

57. The process of claim 55 wherein said aqueous slurry comprises 10–75 wt. % hydrous kaolin, 25–45 wt. % metakaolin, 10–25 wt. % calcined dispersible boehmite, and 5–30 wt. % of said calcined kaolin, said percentages being based upon the weight of alumina-containing components.

58. A method of cracking a hydrocarbon feed under FCC conditions, comprising contacting said hydrocarbon feed with the catalyst of claim 1.

59. The method of claim 58 wherein said hydrocarbon feed and said catalyst are contacted for a time of no more than 3 seconds.

60. The method of claim 59 wherein said catalyst and said hydrocarbon feed are contacted for a time of no more than 1 second.

61. A method of cracking a hydrocarbon feed under FCC conditions, comprising said hydrocarbon feed with the catalyst of claim 6.

62. The method of claim 61 wherein said hydrocarbon feed is a resid containing at least 2000 ppm of Ni and V metals.

63. A method of cracking a hydrocarbon feed under FCC conditions, comprising contacting said hydrocarbon feed with the catalyst of claim 36.

64. The catalyst of claim 1 wherein said reactive microsphere comprises based on the alumina-containing components 5–80 wt. % hydrous kaolin, 20–50 wt. % metakaolin, 0–30 wt. % calcined boehmite, and 0–30 wt. % of a kaolin which has been calcined through the characteristic exotherm, the ratio of metakaolin to kaolin which has been calcined through the characteristic exotherm being at least 1.33.

* * * * *

UNITED STATES PATENT AND TRADEMARK OFFICE
CERTIFICATE OF CORRECTION

PATENT NO.    : 6,942,783 B2
DATED         : September 13, 2005
INVENTOR(S)   : Xu et al.

It is certified that error appears in the above-identified patent and that said Letters Patent is hereby corrected as shown below:

Column 23,
Line 17, insert -- 1 -- after the word "Claim".
Line 23, delete "pare" and replace with -- pore --.

Column 24,
Line 35, delete "10000 Deg F" and replace with -- 1000 Deg F --.

Signed and Sealed this

Seventeenth Day of January, 2006

JON W. DUDAS
*Director of the United States Patent and Trademark Office*